Oct. 11, 1938.   J. A. WILSON   2,132,667
NUT LOCK
Filed May 21, 1937
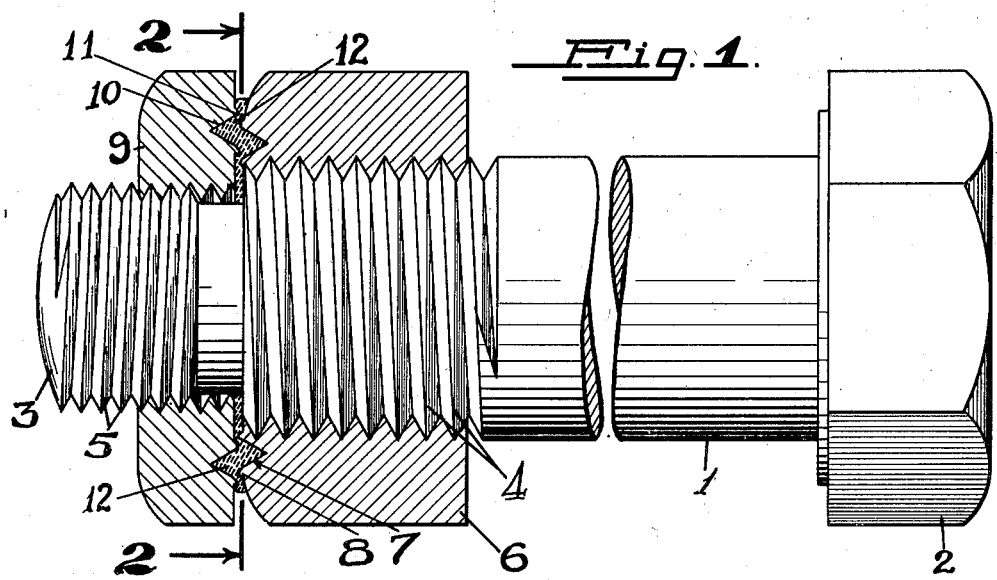
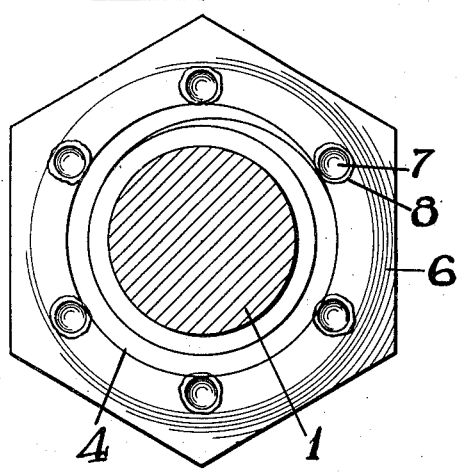
INVENTOR
James A. Wilson
BY J. E. Tralucci
ATTORNEY Patented Oct. 11, 1938

2,132,667

UNITED STATES PATENT OFFICE 2,132,667

NUT LOCK

James A. Wilson, San Francisco, Calif.

Application May 21, 1937, Serial No. 143,989

1 Claim. (Cl. 151—1)

This invention relates to improvements in nut-locks, and more particularly to the kind of a nut-lock having reversely threaded bolt nuts and locking means for preventing the displacement of nuts with respect to one another and to the bolt on which they are screwed.

The primary object of my invention is to provide an improved nut-lock wherein the nuts screwed on the bolt may be securely locked against displacement by novel means interposed between and engaging the nuts.

Another object of my invention is to provide a nut-lock which will effectively lock the nuts carried by a bolt so as to prevent their becoming accidentally unscrewed and lost when they are subjected to a series of jolting or jarring shocks or vibrations.

Other and further objects of my invention will be pointed out hereinafter, indicated in the appended claims or will be obvious to one skilled in the art upon an understanding of the present disclosure. For the purposes of this application I have elected to show herein certain forms and details of a nut-lock representative of my invention; it is to be understood, however, that the embodiment of my invention herein shown and described is for the purpose of illustration only, and that therefore it is not to be regarded as exhaustive of the variations of the invention, nor is it to be given an interpretation such as might have the effect of limiting the claim, short of the true and most comprehensive scope of the invention in the art.

In the accompanying drawing:

Fig. 1 is an enlarged side elevation of a bolt provided with my improved nut-lock invention, the latter being shown in section; and Fig. 2 is an enlarged sectional view taken on the line 2—2 of Fig. 1.

Referring to the drawing the numeral 1 designates a bolt having a head 2 at one end and a reduced extension 3 at its opposite end. That end of the bolt positioned adjacent the extension 3 is provided with a series of right hand threads 4 while the extension itself is provided with a left-hand series of threads 5. The threads 5 are of less pitch than the threads 4, preferably of a ratio of one to 2, thereby permitting the opposing faces of the nuts to be positioned in substantially parallel planes.

Screwed on to the right hand threaded portion of the bolt 1 and ordinarily in engagement with an object to which the bolt is applied, is an inner right hand threaded nut 6, in the outer face of which are formed a series of annularly arranged depressions 7 on the outside of each of which is provided a circular raised member 8. On the extension 3 is screwed an outer left hand threaded nut 9 on the inner face of which are formed a series of annularly arranged depressions 10 on the outside of each of which is provided a circular raised member 11. When the nut 9 is screwed inwardly the raised members 8 and 11 are brought into frictional engagement with the adjacent faces of the nuts 6 and 9 respectively, or with one another. The frictional engagement of the raised members 8 and 11 with the opposing faces of the nuts 6 and 9 respectively, or with one another. The frictional engagement of the raised members 8 and 11 with the opposing faces of the nuts 6 and 9 respectively, or with each other, tends to normally prevent the relative displacement of the said nuts with respect to one another. So as to positively prevent the displacement of the nuts by reason of the abnormal vibration or jarring of the device on which the bolt 1 and nuts are mounted, I preferably interpose a layer of liquid cement, adhesive or solder between the said nuts before they are tightened and brought together. When the nut 9 is screwed toward and into close proximity to the nut 6, the cement 12 is forced into and fills the depressions 7 and 10 and surrounds the raised members 8 and 11. After the cement 12 hardens it forms a rigid member or body which firmly binds the nuts 6 and 9 into a unitary structure which is normally maintained in a fixed position with respect to the bolt. The nuts 9 and 6 are both prevented from becoming unscrewed or loosened irrespective of the agitation to which the device may be subjected.

Having described my invention what I claim is:

A nut-lock comprising a bolt with an end having two adjacent threaded portions of different diameters, the outer portion being of less diameter and provided with threads of less pitch than those of the other threaded portion, and a pair of nuts adapted respectively to be screwed onto said two threaded portions and having their adjacent faces each provided with a series of spaced and annularly arranged depressions, and a series of annularly arranged ring-shaped raised members extending around the depressions of both nuts, and the said depressions and raised members of one nut being positioned directly opposite the depressions and raised members of the other nut.

JAMES A. WILSON.